Feb. 27, 1968
K. R. BANGERTER ET AL
3,370,680
OVERLOAD RELEASED COIL CLUTCH
Filed March 3, 1966
5 Sheets-Sheet 1
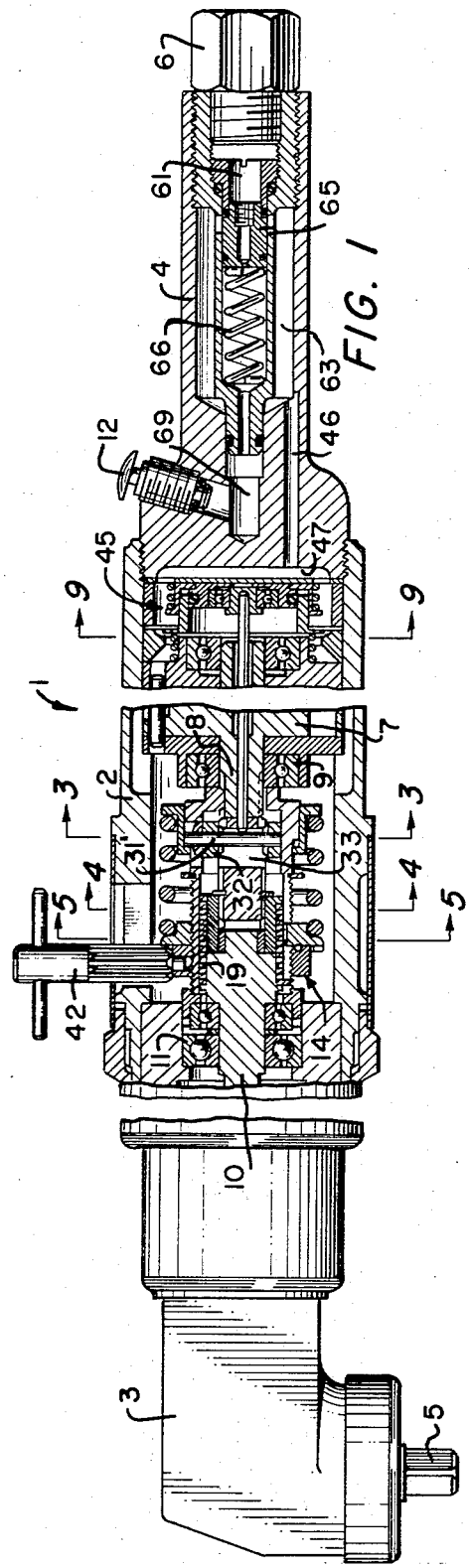
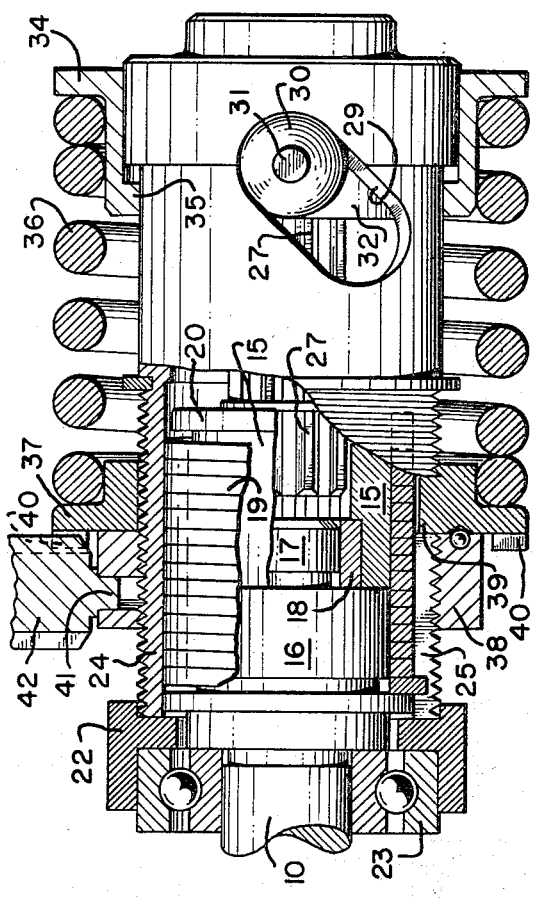
INVENTORS
KENNETH R. BANGERTER
OTMAR M. ULBING
JOHN P. KROUSE
BY David W. Tibbott
ATTORNEY

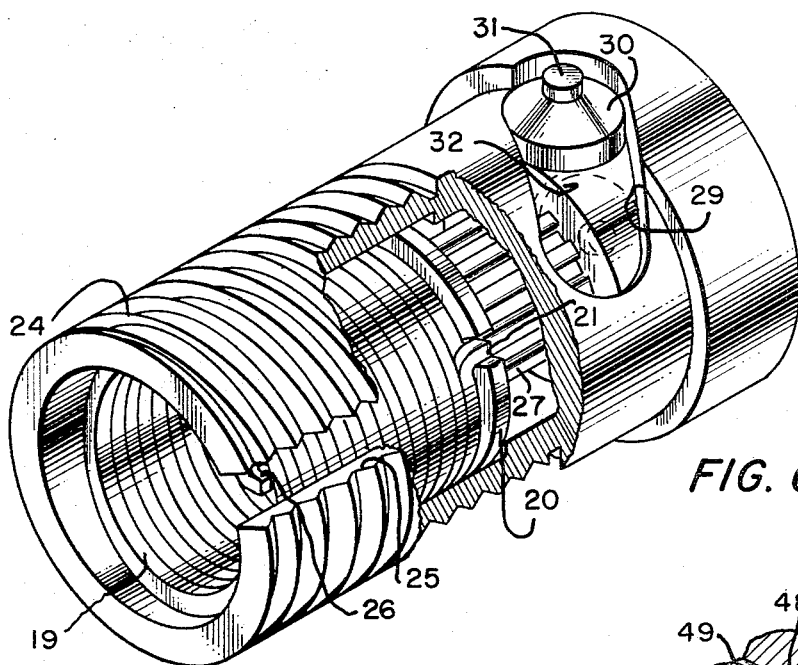
FIG. 6
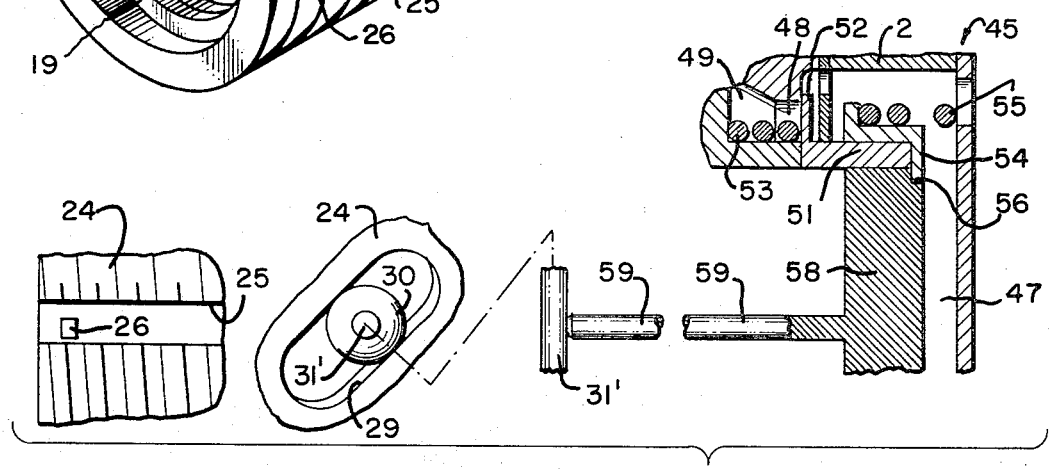
FIG. 8    FIG. 7
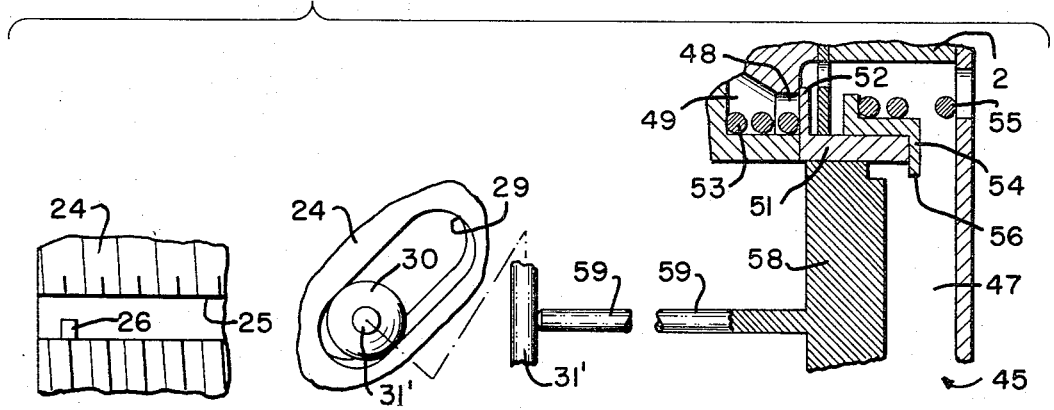

Feb. 27, 1968     K. R. BANGERTER ET AL     3,370,680
OVERLOAD RELEASED COIL CLUTCH

Filed March 3, 1966                                   5 Sheets-Sheet 4

INVENTORS
**KENNETH R. BANGERTER
OTMAR M. ULBING
JOHN P. KROUSE**
BY
*David W. Tillotson*
ATTORNEY INVENTORS
KENNETH R. BANGERTER
OTMAR M. ULBING
JOHN P. KROUSE
BY
David W. Tillotson
ATTORNEY United States Patent Office 3,370,680
Patented Feb. 27, 1968

3,370,680
OVERLOAD RELEASED COIL CLUTCH
Kenneth R. Bangerter, Ithaca, and Otmar M. Ulbing, Berkshire, N.Y., and John P. Krouse, Athens, Pa., assignors to Ingersoll-Rand Company, New York, N.Y., a corporation of New Jersey
Filed Mar. 3, 1966, Ser. No. 531,485
6 Claims. (Cl. 192—56)

ABSTRACT OF THE DISCLOSURE

A power wrench which automatically opens its clutch and stops its motor in response to a predetermined torque load and including a torque-responsive clutch having a wrap spring frictionally gripping and interconnecting driving and driven members and a torque measuring means for sensing torque and unwinding the wrap spring to release the clutch in response to a predetermined torque. The motor of the wrench is automatically shut off by a valve which closes in response to the release of the clutch.

This invention relates to clutches of the type used in high torque power wrenches and the like and, more particularly, to a high torque power wrench having a torque-responsive clutch operable in response to a predetermined torque load to break the driving connection between the wrench spindle and the wrench motor. This invention further relates to shut-off valve means for de-energizing the wrench motor in response to a predetermined torque load on the wrench.

Heretofore, it has been proposed to use various different types of clutch mechanisms in power wrenches for disconnecting the motor from the spindle of the wrench in response to a predetermined torque load. Most of these prior clutch mechanisms have been found to be impractical when used in power wrenches transmitting relatively high torque loads. In general, these prior clutch mechanisms could not withstand the high torque loads used in such wrenches; they either quickly broke down or experienced rapid wear which made them impractical for use in commercial torque wrenches.

The primary object of this invention is to provide a clutch mechanism for use in a power wrench and which can withstand the transmission of relatively high torque loads without experiencing either rapid wear or breakage.

Further objects of this invention are: to provide a high torque power wrench containing a clutch mechanism which acts to open under a predetermined torque load within a preselected relatively narrow torque load range; to provide a power wrench clutch mechanism which opens very rapidly and thus greatly reduces the reaction load on an operator holding the power wrench; to provide a power wrench clutch mechanism which is able to absorb the shock loading in high torque power wrenches without breaking or otherwise rapidly wearing out; to provide a high torque power wrench clutch mechanism which opens in response to a predetermined torque load and also acts to close a shut-off valve for the wrench motor, thus stopping the motor; to provide a novel shut-off valve mechanism for a power wrench which acts in conjunction with a torque measuring means mounted on the wrench; to provide a novel pilot-operated throttle valve for a power wrench; to provide a pilot-operated throttle valve which will prevent the power wrench from being operated under insufficient or relatively low air pressure; to provide a pilot-operated throttle valve which prevents the possibility of an operator from operating the wrench at half throttle; and to provide a novel high torque power wrench clutch mechanism which has a high degree of smoothness in releasing or opening without transmitting high reaction impact loads to the wrench casing.

In brief, these objects are attained by providing a power wrench with a clutch including driving and driven members interconnected by a wrap spring encircling and grasping said members for accomplishing the transmission of torque and by providing a clutch opening means responsive to a predetermined torque load on the driving and driven members for unwinding the wrap spring to open or release the clutch, providing shut-off valve means which is normally open and is operative, in response to the torque load, to close and shut off air fed to the wrench motor, and providing means for holding the clutch open in response to the closing of the shut-off valve, the last mentioned means being operative to allow the clutch to re-engage in response to the reopening of the shut-off valve.

The invention is described in connection with the accompanying drawings wherein:

FIG. 1 is an elevational view with portions broken away and shown in section of a power wrench embodying this invention;

FIG. 2 is a fragmentary enlarged elevational view with portions broken away illustrating the clutch shown in FIG. 1;

FIG. 6 is an enlarged perspective view with portions cut away of the clutch, and with the driven member omitted;

FIG. 7 is an enlarged fragmentary section somewhat diagrammatically illustrating the shut-off valve shown in FIG. 1 in a closed position and the clutch remaining engaged;

FIG. 8 is a view similar to FIG. 7 illustrating the further movement of the valve piston after the closure of the shut-off valve for the disengagement of the clutch;

Figure 3:
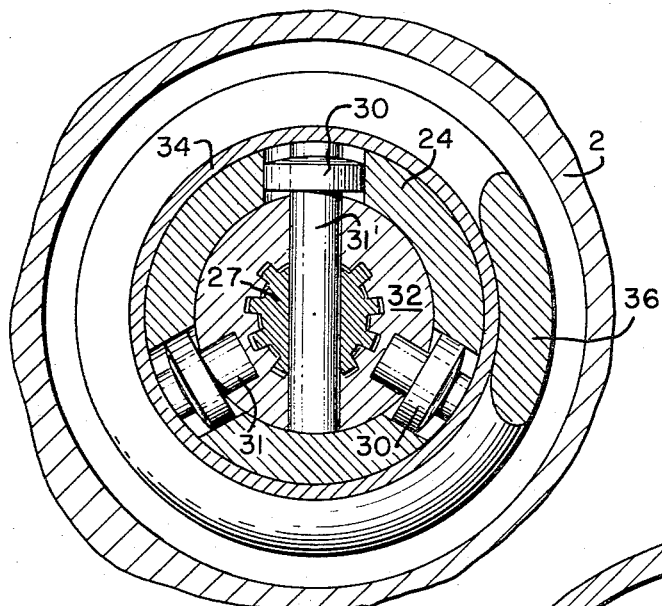
FIG. 3 is an enlarged section taken on line 3—3 of FIG. 1.
Figure 4:
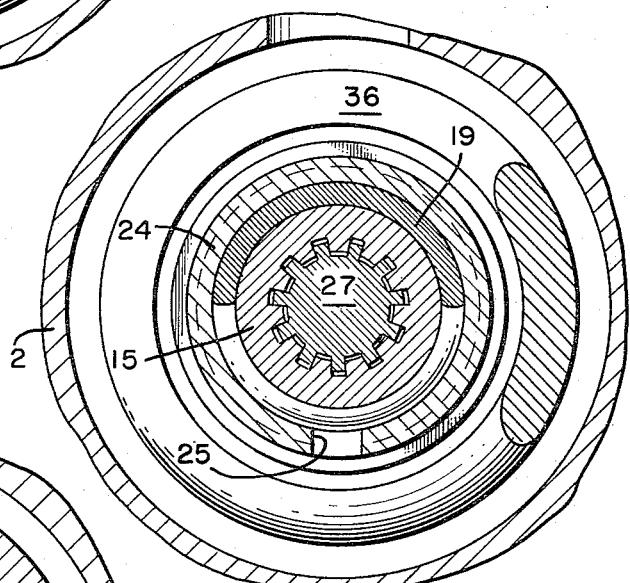
FIG. 4 is an enlarged section taken on line 4—4 of FIG. 1.
Figure 5:
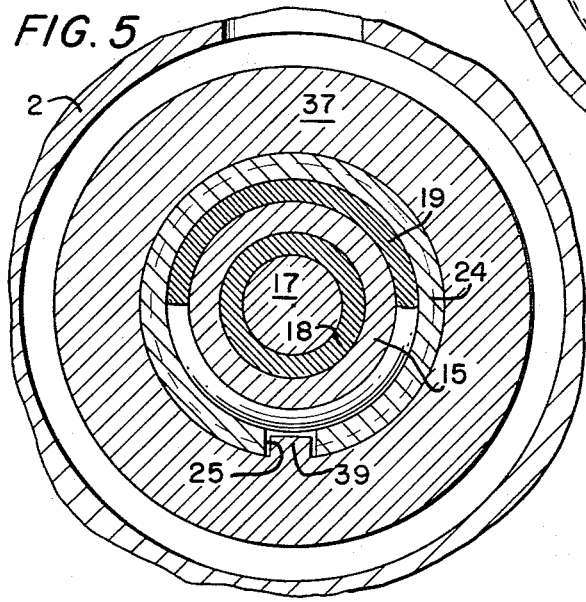
FIG. 5 is an enlarged section taken on line 5—5 of FIG. 1.

The power wrench 1 shown in FIG. 1 is generally known as a torque wrench or angle wrench and comprises a casing 2 including a front or nose 3 and a backhead 4. The nose 3 contains the usual spindle 5 adapted to be connected to a conventional wrench socket (not shown) for driving fasteners. The backhead 4 is adapted to be connected to the coupling 6 of a hose (not shown) for feeding pressure fluid to the wrench. The wrench 1 contains a conventional pressure fluid operated motor 7 having a motor drive shaft 8 mounted in bearings 9. The wrench 1 further contains a driven shaft 10 mounted in bearings 11 and connected to the spindle 5 by a group of conventional gears which are not shown in the drawings. The backhead 4 contains a throttle button 12 adapted to be actuated by the operator for running the power wrench 1. All of the foregoing structure is conventional in the power wrench art.

The motor drive shaft 8 is connected to the driven shaft 10 by a torque responsive clutch 14 adapted to be opened or released when the torque load on the wrench spindle reaches a predetermined value. In general, the clutch 14 comprises a driving clutch member or short hollow shaft 15 shown in FIG. 2 and driven clutch member or enlarged cylindrical head 16 integrally formed on the rear end of the driven shaft 10. The driven shaft head 16 includes a rearwardly projecting concentric stud 17 carrying a sleeve bearing 18 journaled in the short hollow shaft 15 whereby the hollow shaft 15 is free to turn on the bearing 18 relative to the driven shaft head 16. All of the foregoing structure is illustrated in FIG. 2.

The short hollow shaft 15 has the same diameter as the head 16 on the driven member driven shaft 10 so that the two circumferences are aligned. These two circumferences are surrounded by a single helically wound "wrap" spring 19 for transmitting torque from the driving hollow shaft 15 to the driven shaft head 16. The rear end of the short hollow shaft 15 contains a circumferential rib 20 having a notch receiving a rearwardly extending tang 21 formed on the rear end of the wrap spring 19, as shown in FIG. 6. The tang 21 locks the spring 19 to the driving hollow shaft 15.

Looking at FIG. 6, the wrap spring 19 is wound, from its forward end to the tang 21 at its rear end, in a counterclockwise direction. Winding the spring 19 in this direction results in a counterclockwise torque applied to the hollow shaft 15 serving to wrap the spring tightly around the driven head 16 on the driven shaft 10 causing the spring 19 to grasp the circumferences of both the head 16 and the driving hollow shaft 15 with sufficient friction for transmitting torque between the two clutch members, 15 and 16. The spring 19 serves as an excellent means for transmitting torque between these members.

The two clutch members 15 and 16 are released by slightly opening or unwinding the wrap spring 19. This is accomplished by rotating the two ends of the spring 19 relative to each other through a small angle sufficiently to unwind the spring so that it no longer grasps the two clutch members 15 and 16. This result is carried out in response to a predetermined torque load on the wrench by the structure described below.

CLUTCH-OPENING MEANS

A large sleeve 24 is connected at its rear end to the motor drive shaft 8 by splines, as shown in FIG. 1. The large sleeve 24 extends forwardly over the wrap spring 19 and seats at its front end against a ring 22 which rides on the outer race of a thrust bearing 23 mounted on the driven shaft 10.

The bearing 23 is best shown in FIG. 2 and allows the sleeve 24 to rotate freely relative to the driven shaft 10 while preventing the sleeve 24 from moving axially forward. The sleeve 24 includes a longitudinal slot 25 receiving the front tang 26 formed on the front end of the wrap spring 19. In the engaged position of the clutch, the spring tang 26 is spaced away from the side of the slot 25 which must engage the spring tang 26 in order to unwind the spring 19. FIG. 6 illustrates this position of the spring tang 26. The spring 19 is unwound, for releasing or opening the clutch 14, by rotating the large sleeve 24 in a counterclockwise direction, as shown in FIG. 6, relative to the hollow drive shaft 15. A short stub shaft 27 is splined into the rear end of the hollow shaft 15 and projects rearwardly to terminate against the front end of the motor drive shaft 8. The stub shaft 27 is interconnected to the large sleeve 24 by a means which allows the large sleeve 24 to rotate relative to the stub shaft 27 through a limited angle.

The large sleeve 24 contains three helical slots 29 formed in the rear portion of its circumference. Each of the helical slots 29 receive respective rollers 30. The rollers 30 are pivoted on radial pins 31 mounted in a collar 32 which is splined on the stub shaft 27 for slidable movement. One of the pins 31' extends diametrically through both the collar 32 and a diametrical slot 33 formed in the stub shaft 27. The helical slots 29 provided in the large sleeve 24 are arranged so that, looking at FIG. 6, counterclockwise rotation of the large sleeve 24 will urge the rollers 30 axially forward and in a clockwise direction in the slots 29 relative to the sleeve 24.

The rollers 30 are urged axially rearward on the sleeve by a spring arrangement shown in FIG. 2. This arrangement includes an annular spring cup 34 slidably mounted on the sleeve 24 and having an inner flange 35 engaging the outboard ends of the pins 31. The spring cup 34 is urged rearwardly by a large spring 36 which circles the sleeve 24. The forward end of the spring 36 is engaged by an annular spring seat 37 held in place by a large nut 38 threaded on the sleeve 24. The spring seat 37 includes an internal key 39 sliding in the longitudinal slot 25 formed in the sleeve 24 to prevent the spring seat 37 from rotating on the sleeve 24.

One manner of adjusting the nut 38 on the sleeve 24 is illustrated in FIGS. 1 and 2. The spring seat 37 is provided with a series of gear teeth 40 on its front face. The nut 38 includes radial holes adapted to receive the front pin 41 of a "Jacobs chuck" gear key 42 with the teeth of the gear key 42 engaging the teeth 40 on the spring seat 37. Turning the gear key 42 results in rotating the nut 38 on the sleeve 24 which, in turn, varies, and adjusts the spring load on the large spring 36.

The load on the large spring 36 determines the torque necessary to cause the rollers 30 to move axially forward in the slots 29. In other words, the torque required to move the rollers 30 axially forward in the slots 29 must be sufficient to overcome the stress load on the spring 36. As previously explained, when the rollers 30 move forward in the slots 29, the hollow drive shaft 15 is rotated relative to the large sleeve 24 to unwind the wrap spring 19 causing it to release the driven clutch member 16.

SHUT-OFF VALVE MEANS

A shut-off valve means 45 is provided for closing off the air passage to the motor 7 in response to the opening or releasing of the clutch 14 at a predetermined and selected torque load on a fastener. This shut-off valve means 45 is shown in FIGS. 1, 7 and 8. Looking at FIG. 1, air pressure flows through a passage 46 into a chamber 47 formed in the casing 2. The chamber 47 communicates through a valve seat 48 into a motor passage 49 extending to the motor 7. The shut-off valve means 45 is adapted to control the passage of air through the valve seat 48.

The shut-off valve means 45 includes an annular valve 51 having a radially outwardly extending valve flange 52 adapted to seat over the valve seat 48 to bar the passage of air from the valve chamber 47 to the motor passage 49, as shown in FIG. 8. The valve 51 is urged to an open position by a light spring 53, as shown in FIG. 1. An annular valve follower 54 slides over the rear end of the valve 51 and is urged forwardly by a spring 55 which is slightly stronger than the spring 53 so that it can overcome the force exerted by the spring 53. The valve follower 54 includes an inwardly directed lip 56 extending over the rear end of the valve 51 so that the follower 54, and its spring 55, can act to close the valve 51 when the valve follower 54 is released.

A piston 58 is slidably mounted for axial movement in the valve 51 and is arranged at its rear end to engage the lip 56 on the valve follower 54. The piston 58 is connected to the clutch 14 by a push rod 59 which extends forwardly from the piston through a passage in the motor drive shaft 8 and engages the radial pin 31' which extends through the stub shaft 27, as shown in FIG. 1.

The push rod 59 is a link between the clutch 14 and the valve means 45 serving to hold the valve means 45 open when the clutch 14 is engaged. With the clutch engaged and the rollers 30 located in the rear ends of the slots 29, the push rod 59 urges the piston 58 against the rear end of the air chamber 47 in the position shown in FIG. 1. In this position the piston 58 holds the valve follower 54 against the rear end of the chamber 47 so that the spring 53 is able to urge the valve 51 to a valve-open position. Also, the pressure on both sides of the piston 58 is balanced so that the piston 58 is not urged forward by air pressure.

During the initial movement of the clutch 14, as a result of the rollers 30 moving forwardly in the slots 29, the piston 58 is moved forward by the compression load on the valve follower spring 55 to the position shown in FIG. 7, wherein the valve follower 54 is moved forward to urge the valve 51 to a closed position. After the valve 51 closes, a differential air pressure is rapidly created across the piston 58 which acts to urge the piston 58 forwardly to the position in FIG. 8. In moving to its full forward position, shown in FIG. 8, the piston 58 acts through the push rod 59 to hold the clutch 14 in a fully released position. As a result, the clutch 14 remains released until the pressure is exhausted from the chamber 47. The throttle valve for controlling the application of air pressure to the chamber 47 is described below.

PILOT-OPERATED THROTTLE VALVE

Figure 10:
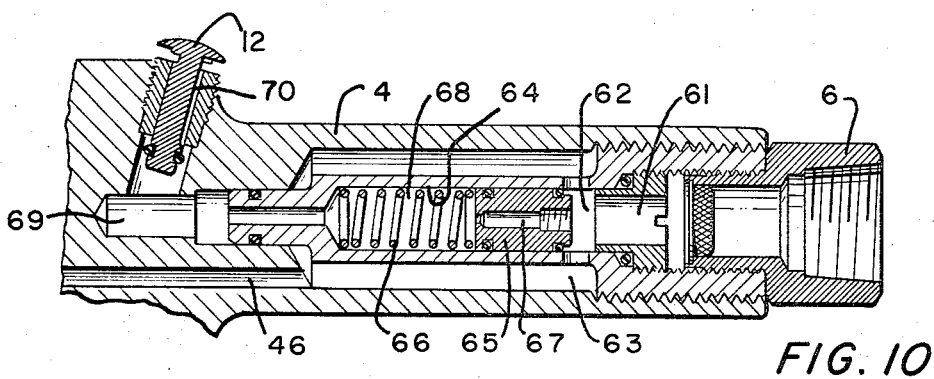
FIG. 10 is an enlarged fragmentary section showing the pilot-operated throttle valve of FIG. 1 in an open postion.
Figure 9:
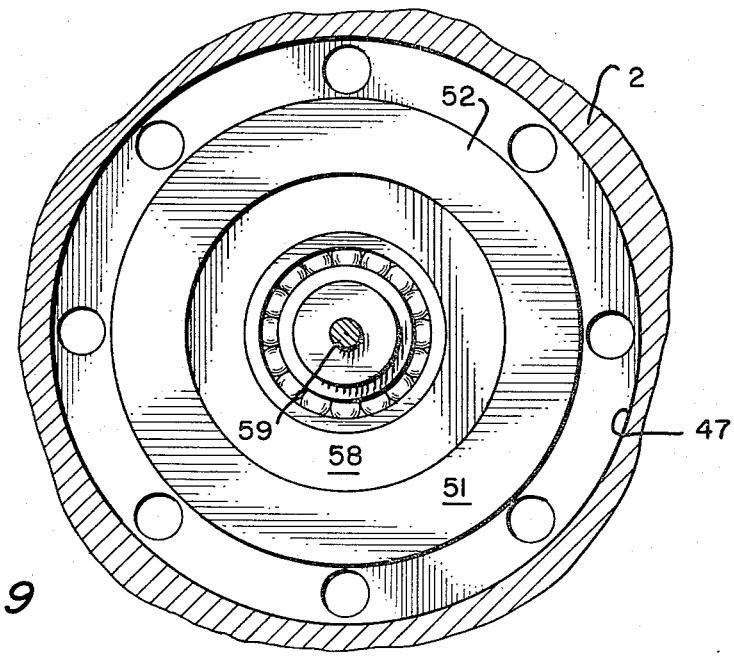
FIG. 9 is a section taken on the line 9—9 of FIG. 1.

Looking at FIGS. 1 and 10, the backhead 4 contains an inlet chamber 61, a valve seat 62, and an outlet chamber 63. Air flows from the hose coupling 6 through the inlet chamber 61, the valve seat 62, the outlet chamber 63 into the passage 46 extending to the shut-off valve 45. The backhead 4 further contains a cylindrical bore 64 housing a slidable spool valve 65 adapted to seat on the valve seat 62 and a spring 66 urging the spool valve 65 against the seat 62. Normally, the spring 66 maintains the spool valve 65 against the seat 62 to close off air flow from the inlet chamber 61 to the outlet chamber 63. In addition, the spool valve 65 contains a small longitudinal vent passage 67 extending into the portion of the bore 64 housing the spring 66. This portion of the bore 64 housing the spring 66 is termed a pilot chamber 68.

The pilot chamber 68 is connected to the throttle button 12 by a dump passage 69. The throttle button 12 serves to exhaust the dump passage 69 to atmosphere, when moved inwardly to an open position. When closed, the throttle button 12 disconnects the dump passage 69 from atmosphere. The throttle button 12 contains an elongated leak channel 70 for communicating the dump passage 69 to atmosphere when the button 12 is pushed inwards, as shown in FIG. 10. Normally, when the push button 12 is seated, the air pressure from the hose coupling 6 entering the inlet chamber 61 flows through the vent passage 67 in the spool valve 65 into the pilot chamber 68 to prevent a pressure differential from building up across the end faces of the spool valve 65. As a result, the spring 66 is effective to force the spool valve 65 against the valve seat 62 and close off communication between the inlet chamber 61 and the outlet chamber 63.

However, when the throttle button 12 is pushed inward, the pilot chamber 68 is exhausted through the passage 69 and the channel 70 to atmosphere. Exhausting the pilot chamber 68 creates a differential in pressure across the spool valve 65 of sufficient magnitude to cause the spool valve to be unseated and forced to its open position shown in FIG. 10. The spool valve 65 will remain in the open position as long as the throttle button 12 is held in its inner position shown in FIG. 10. When the throttle button 12 is released, air pressure in the dump passage 69 rapidly returns the throttle button to its seated position shown in FIG. 1. When the throttle button is again seated, air pressure immediately builds up in the pilot chamber 68 to eliminate the differential pressure across the end faces of the spool valve 65 whereby the spring 66 is again effective to seat the spool valve 65.

The pilot-operated throttle valve prevents the wrench from being operated at insufficient air pressure or at half throttle. If the air pressure in the supply hose is insufficient or too low, the spring 66 will keep the valve 65 from being opened. Half-throttle operation is prevented by the fact that it is substantially impossible for the valve 65 to be partially open, i.e., it is either fully open or closed.

OPERATION

At the start of the description of an operating cycle of the wrench 1, it is assumed that the hose coupling 6 is connected to a source of air pressure, the push button throttle 12 is closed and the spool valve 65 is also closed to seal off the air pressure in the hose coupling 6 from the passage 46, chamber 47 and the motor passage 49. In addition, the motor 7 is at rest, the shut-off valve means 45 is open and the clutch 14 is closed. It is also assumed that a suitable fastener socket (not shown) is attached to the wrench spindle 5. The nut 38 on the large clutch sleeve 24 has been previously adjusted by means of the gear key 42 to place the proper load on the clutch spring 36 to render the clutch 14 operative to open under a predetermined torque load on the wrench. The gear key 42 will be withdrawn from its position shown in the wrench in FIGS. 1 and 2 and laid aside during the operation of the wrench. In short, the positions of the various operating elements of the wrench 1 will be similar to the positions shown in FIG. 1 prior to the start of the wrench operation. It will also be noted that the spring tang 26 of the clutch spring 19 is spaced from the side of the slot 25 required to engage and unwind the spring 19.

The wrench operator grasps the wrench casing 2 in the usual manner and places the socket (not shown) on the spindle 5 over a fastener such as a nut, also not shown. Thereafter the operator will depress the throttle button 12 which serves to exhaust the pilot chamber 68 causing the spool valve 65 to move to the full open position as shown in FIG. 10. When the valve 65 opens, full air pressure enters the outlet chamber 63, flows through the passage 46 and into the valve chamber 47. Since the shut-off valve means 45 is open, air pressure flows past the valve 51 and valve seat 48 into the motor passage 49 and, thence, to the motor 7. As a result, the motor begins turning.

As the motor 7 turns, it drives the clutch sleeve 24 which, in turn, transmits torque through the clutch rollers 30, clutch pins 31, the collar 32, and the stub shaft 27. The stub shaft 27 drives the driving clutch member 15. As the driving clutch member 15 rotates in a counter-clockwise direction, as shown in FIG. 6, it serves to wind up the wrap spring 19 which, thus, tends to grab the driven clutch member 16 sufficiently to lock the two clutch members 15 and 16 together. Torque is transferred from the driven clutch member 16 to the spindle 5 through conventional planetary and bevel gears in a manner conventional in angle wrenches.

As the fastener is tightened, the torque load on it rises, causing the torque load on the clutch members 15 and 16 to rise accordingly. Ultimately, the torque load on the clutch 14 will reach a predetermined value sufficient to cause the clutch rollers 30 to move axially forward and in a clockwise direction in the helical slots 29, as shown in FIG. 6. This predetermined torque load will depend on the initial stress placed on the clutch spring 36. As the clutch rollers 30 rotate relative to the clutch sleeve 24, they will also cause relative rotation between the driving clutch member 15 and the clutch sleeve 24. However, initial relative rotation between driving clutch member 15 and the clutch sleeve 24 will not unwind the spring 19 because the spring tang 26 is not initially engaged by the side of the slot 25. The wrap spring 19 will only be unwrapped sufficiently for it to release the driven clutch member 16 at the end of the relative rotation between the driving clutch member 15 and the sleeve 24.

In addition, as the rollers 30 move axially forward initially in the helical slots 29, the push rod 59 of the shut-off valve means 45 is allowed to move forward by the axial forward movement of the roller pin 31'. With the release of the push rod 59, the valve follower spring 55 forces the push rod 59, the valve 51, the valve follower 54 and valve piston 58 forward to the positions shown in FIG. 7 wherein the shut-off valve is closed. This action disconnects and seals off the motor passage 49 from the air pressure in the air chamber 47 causing the motor 7 to cease operation. At this moment, the clutch is still engaged, as shown in FIG. 7, by the fact that the spring tang 26 remains spaced from the sides of the slot 25.

After the valve 51 closes a differential air pressure is rapidly built up across the opposite faces of the valve piston 58 which acts to urge the valve piston and the push rod 59 an additional distance forward to the position shown in FIG. 8. This additional forward movement of the valve piston 58 by means of the differential pressure built up serves to open the clutch 14 and hold it in an open and released position so long as the pressure differential continues to act on the valve piston 58. The clutch 14 is opened as a result of the rollers 30 traveling to the front ends of the helical slots 29 caused by a combination of the torque on the clutch and the force supplied by the push rod 59. At this time, it is normal for the operator to remove the wrench from the fastener. Thus, the clutch opens after the valve 51 is closed.

At the same time, the operator may release the throttle button 12, allowing it to return to the closed position, as shown in FIG. 1. The release of the throttle button 12 seals the pilot chamber 68 from the atmosphere which allows the pressure to again build up in the pilot chamber 68. The resultant rise of pressure in the pilot chamber 68 cancels the differential pressure across the spool valve 65 which allows the spring 66 to return the spindle valve to the closed position, as shown in FIG. 1.

Once the spool valve 65 closes, the normal leakage of air in the wrench rapidly exhausts the remaining air pressure from the shut-off valve chamber 47 to eliminate the air pressure acting on the shut-off valve piston 58. With the exhaust of the air pressure acting on the valve piston 58, the clutch 14 again closes and forces the air piston 58 to its rearward position shown in FIG. 1 with a resultant opening of the shut-off valve 45. The return of the various elements to the non-operating positions, shown in FIG. 1, occurs very rapidly once the throttle button 12 is released. At this time the wrench 1 is ready for another cycling.

SECOND EMBODIMENT OF SHUT-OFF VALVE
FIGS. 11 TO 13

Figure 11:
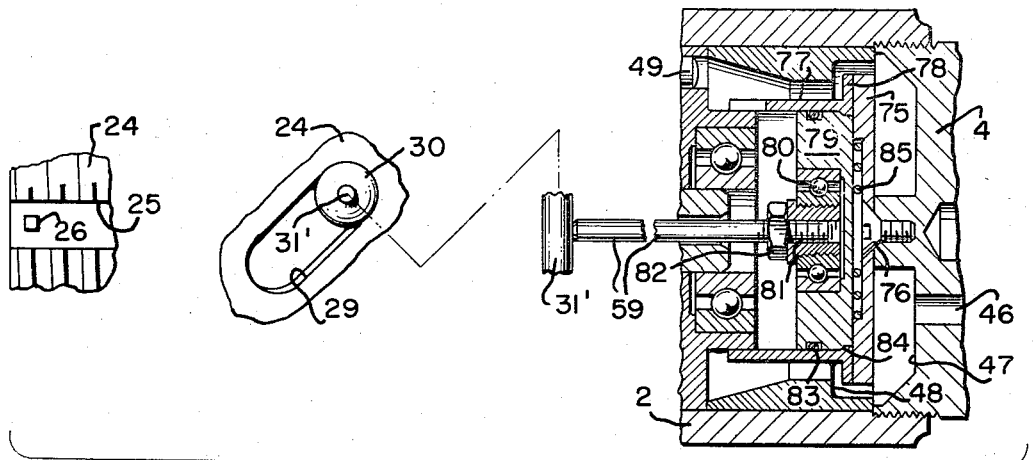
FIGS. 11 to 13 are diagrammatic views similar to FIGS. 7 and 8 showing a second embodiment of shut-off valve in various positions relative to the clutch.
Figure 12:
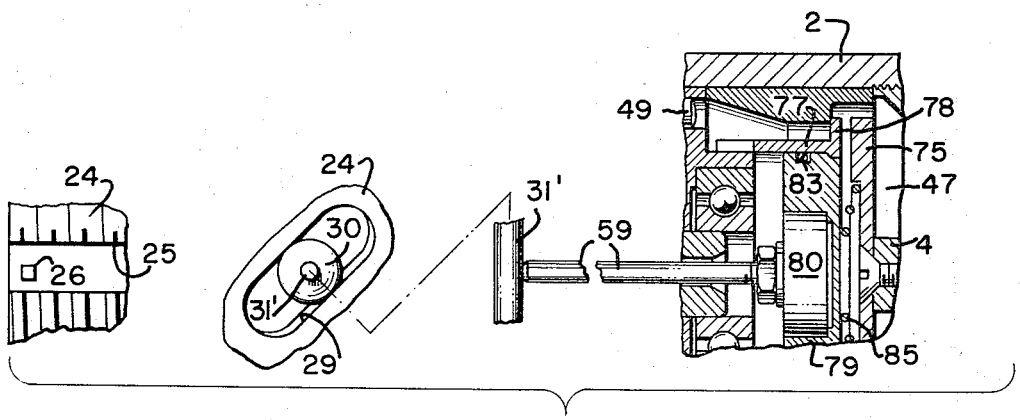
Figure 13:
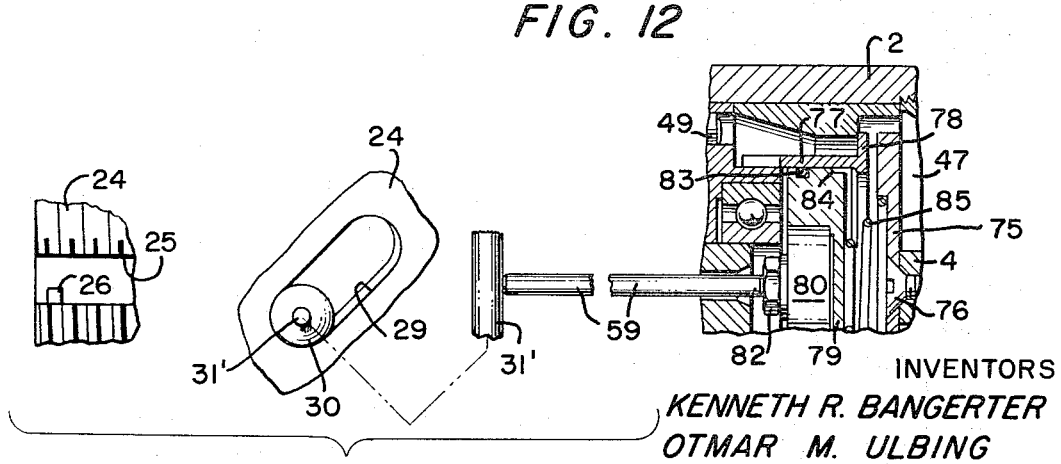

In describing the structure shown in FIGS. 11 to 13, identical reference numbers are applied to parts corresponding to those shown in the earlier embodiment. As a result, FIGS. 11 to 13 contain a casing 2, a backhead 4, an air passage 46 feeding air to valve chamber 47, a valve seat 48 and a motor passage 49. The portions of the clutch including the clutch sleeve 24 are identical to the first embodiment.

The second embodiment of shut-off valve includes a valve stop-plate 75 located in the valve chamber 47 and fixed to the backhead 4 by a central screw 76. An annular sleeve-shaped valve 77 is movably positioned in the valve chamber 47 between the stop-plate 75 and the valve seat 48 and is provided with a radial flange 78 adapted, when moved forwardly, to seat on the valve seat 48 for barring air from flowing from the valve chamber 47 to the motor passage 49. The annular valve 77 is slidably mounted on a piston 79 which is mounted on the push rod 59 by means of a ball bearing 80 and a threaded joint 81. The threaded joint 81 allows the position of the piston 79 to be adjusted on the push rod 59. A nut is threaded on the push rod 59 for locking the threaded joint 81 after the adjustment is completed.

The periphery of the piston 79 carries an O-ring 83 sliding inside the annular valve 77 for preventing leakage between the piston and valve and for providing a slight drag force between the piston 79 and valve 77 causing the valve 77 to move forward with the piston 79 towards the shut-off position.

The periphery of the piston 79 further includes a shoulder 84 adapted to engage a corresponding internal shoulder on the valve 77 for causing the valve 77 to be forced rearwardly, away from the valve seat 48, by the rearward movement of the piston 79. The piston 79 is urged forward by a small spring 85 interposed between the piston 79 and the valve stop-plate 75.

FIG. 11 shows the position of the valve 77 and associated parts in the normal engaged position of the clutch. In this position the valve 77 is held in an open position by the piston 79 seating against the stop-plate 75.

FIG. 12 shows the valve 77 in a closed position and the piston 79 moved forwardly only enough to allow the valve 77 to close. In this position, the clutch remains engaged as the spring tang 26 is not yet engaged by the side of the slot 25 in the clutch sleeve 24, as shown in FIG. 12.

Once the valve 77 closes, the piston 79 is forced to the position shown in FIG. 13 by a differential pressure acting across the piston 79, the same as in the first embodiment. As the piston 79 completes its forward movement, it opens the clutch by unwrapping the spring 19.

The important differences between the second shut-off valve embodiment and the first embodiment are: the valve 77 cannot be closed without forward movement of the piston 79; and the second embodiment has fewer parts.

Although two embodiments of the invention are illustrated and described in detail, it will be understood that the invention is not limited simply to these embodiments, but contemplate other embodiments and variations which utilize the concepts and teachings of this invention.

Having described our invention, we claim:

1. A torque-responsive clutch for use in power wrenches and the like, comprising:
   a driving member;
   a driven member;
   a helical spring connected to said driving member and wrapped around said driven member in a manner so that torque applied to said spring by said driving member serves to wind said spring in a direction causing it to grip said driven member for transmitting torque to it;
   torque measuring means mounted on said driving member and operable, in response to a predetermined torque load on said driving member, to wind said spring in a direction opposite to that caused by the torque load on the spring to cause the spring to release its grip on said driven member;
   said torque measuring means including an element mounted on said driving member and connected to one end of said spring, said element being normally operable to transmit torque to said driving member and being operable, in response to the torque load on the driving member, to rotate relative to said driving member to release said spring; and
   said torque measuring means including a portion which moves axially in response to the torque load on said driving member.

2. The clutch of claim 1 including:
   spring means urging said axially moving portion of said torque measuring means in a direction opposite to the action of the torque load on said axially moving portion.

3. The clutch of claim 2 wherein:
   said spring means includes means for adjusting and varying the spring load opposing movement of said axially moving portion of said torque measuring means.

4. The clutch of claim 3 wherein:
   said element is a sleeve surrounding said driving member and said helical spring.

5. The clutch of claim 4 wherein:
   said axially movable portion is connected to said sleeve by a cam means which allows said sleeve to rotate relative to said driving member in response to a torque load.

6. The clutch of claim 5 wherein:

said spring means surrounds said sleeve and said means for adjusting the spring load on said spring means includes a nut threaded on said sleeve.

References Cited

UNITED STATES PATENTS

| | | |
|---|---|---|
| 1,561,537 | 11/1925 | Hayes. |
| 2,459,972 | 1/1949 | Starkey _____ 192—56 |
| 2,510,667 | 6/1950 | Starkey _____ 192—56 |
| 2,626,029 | 1/1953 | Gutterman _____ 192—56 |

BENJAMIN W. WYCHE, III, *Primary Examiner.*